UNITED STATES PATENT OFFICE.

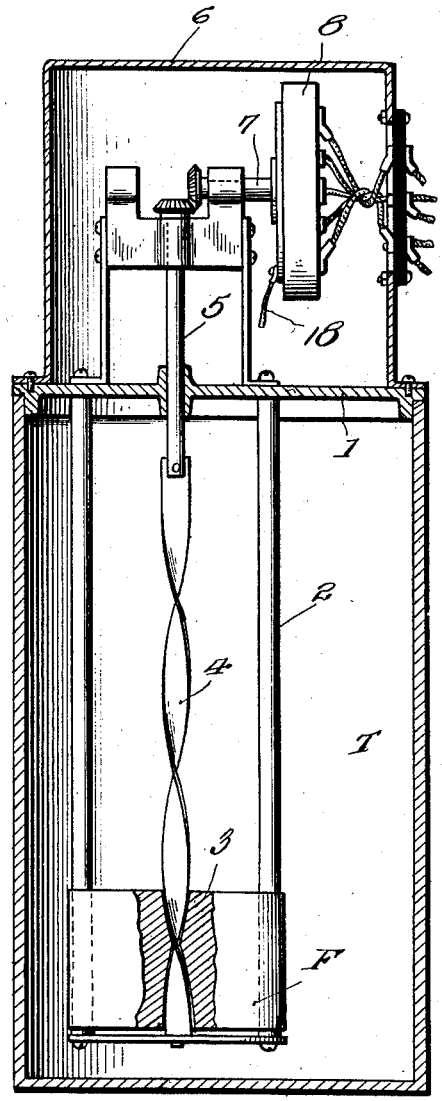

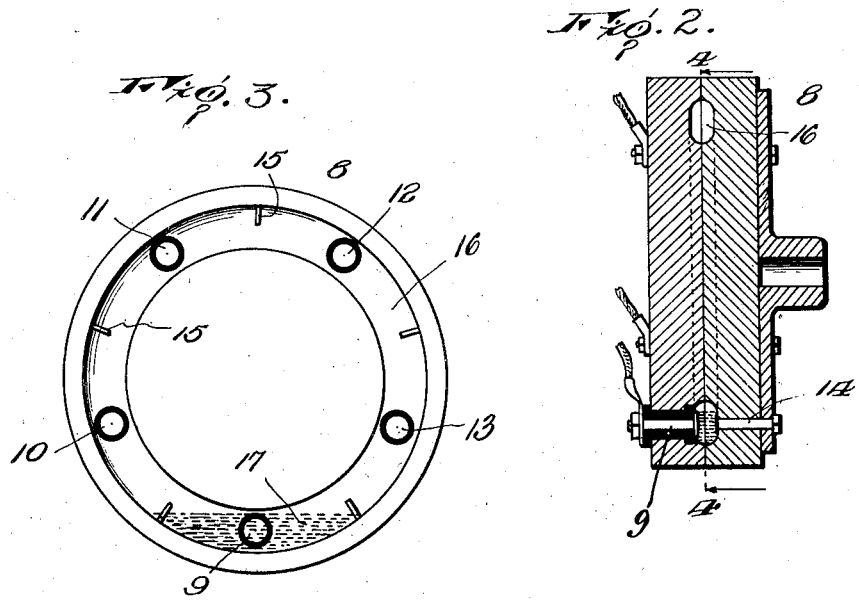

JOHN W. MILLER, OF SEATTLE, WASHINGTON.

LIQUID GAGE AND INDICATOR.

1,381,212. Specification of Letters Patent. Patented June 14, 1921.

Application filed May 27, 1919. Serial No. 300,032.

*To all whom it may concern:*

Be it known that I, JOHN W. MILLER, a citizen of the United States, residing at Seattle, in the county of King and State of Washington, have invented certain new and useful Improvements in Liquid Gages and Indicators, of which the following is a specification.

My invention relates to liquid gages by means of which the position of a float which rises and falls in conformity with the height of liquid surface, and hence the depth of the liquid may be indicated electrically at any desired distance from the vessel containing the liquid.

My invention may be used in any container of liquid, but is more particularly adapted to airplanes or motor boats or any vehicle which uses liquid fuel either directly or indirectly as a propelling medium. It is a common practice where liquid fuel is used, to employ a gage consisting of a float inside of the tank, which actuates a quantity indicating device designed to be read from the outside of the tank.

I am aware that attempts have been made to produce a liquid gage which would indicate by electrical means the position of such a float, but these devices were dangerous when used in a container of volatile liquids, the vapors of which become explosive when mixed with air. The danger is due to making or breaking an electrical circuit inside the tank, thus producing a spark in the presence of an explosive mixture; and this danger I have overcome by means of the present invention in which the contact points are hermetically inclosed so that no vapor can reach them. Also I employ an indicator by which it is possible to determine at any convenient distance from the tank the amount of liquid therein.

In the drawings:

Figure 1 is a side elevation of the circuit closer and the float-actuated means for moving it, showing the tank and the housing in section;

Fig. 2 is an enlarged vertical section through the center of the circuit closing disk;

Fig. 3 is an elevation of one of the parts or halves of this disk, being in effect a section on the line 4—4 of Fig. 2.

In the drawings the letter T designates broadly a tank for liquid fuel whose top 1 may be removable and is shown herewith as carrying upright guides 2 on which a float F may slide vertically as the liquid level within the tank rises and falls. An appropriate upright opening 3 through the float receives a worm 4, made preferably in the form of a twisted ribbon of metal, which worm connects at its upper end with a shaft 5 journaled through and rising above the cover 1 and connected in any appropriate manner, as by the gears shown, with a shaft 7 which supports the rotary circuit closer hereinafter described, these shafts and their connection as well as the entire circuit closer being by preference inclosed with a housing 6 here shown as mounted directly on the tank cover 1. It will be observed that by the construction so far described everything is removed from the interior of the fuel tank excepting the guides, the float, and the worm; and it is the rotation of the shaft 5 by said worm which is made use of exteriorly of the tank to indicate the liquid level inside. As these tanks are not always located at a point where the indicator may be conveniently seen, I prefer to provide a rotary circuit closer turned on its axis by the movements of the float, and connect the contacts of said circuit closer by wires with an indicator at a remote point, doubtless on the dash of the motor vehicle.

The circuit closer 8 best seen in Figs. 2 and 3 is a disk preferably made up of two parts, and these may be of metal or other suitable material properly connected, one part being fixed on one end of the shaft 7. The meeting faces of the two parts are provided with registering annular grooves which, when they are assembled, produce a channel 16 in which I place a small quantity of mercury indicated at 17. At several points within this channel are baffles 15 projecting from its outer side radially inward and perhaps half way across it, their purpose being to prevent the charge of mercury from being washed out of place by the vibrations of the motor vehicle. Insulated through one of the parts are terminals 9, 10, 11, 12 and 13 as seen in Fig. 3, their inner ends entering the channel 16. Through the other part are alined terminals 14, insulated or not as preferred, and these are connected by a wire 16 with one side of a battery. The other terminals 9 to 13 are connected by separate wires to an indicator and thence to the other side of said battery. Therefore when the movements of the float turn the shaft 7 and bring one pair of terminals at the bottom, as shown in Fig. 3, the mercury 17 will close the circuit through them and actuate an indicator at a remote point.

It will be noted that all parts of the electrical equipment are outside of the tank and so far as possible remote from it. Even the actual closing points in the circuit closer are hermetically sealed within the channel in the disk, so that if there should be any sparking there is no possibility that vapors rising from the gasolene may be ignited.

Having thus described the invention, what is claimed as new is:

1. A circuit closer comprising a disk inclusive of two coacting sections having their opposed sides flatly in contact and provided with annular grooves forming an internal channel, pairs of contacts extending from said coacting sections into said channel from opposite sides of the same, a quantity of mercury arranged in said channel, and means to operate said disk.

2. The herein described circuit closer comprising a disk standing in an upright plane and having an internal annular channel, baffles located at intervals in the channel and projecting radially inward partway across it, a series of contact points disposed in pairs midway between said baffles with their tips projecting into said channel, a charge of mercury within said channel, and means for turning the disk on its axis.

3. A circuit closer comprising a disk inclusive of two coacting sections having their opposed sides flatly in contact and provided with annular grooves forming an annular channel, pairs of contacts extending from said coacting sections into said channel from opposite sides of the same, a quantity of mercury arranged in said channel, a plurality of radially disposed spaced baffle plates extending inwardly from the outer side of said annular channel and terminating inwardly of the inner side of the same, and means to operate said disk.

In testimony whereof I affix my signature.

JOHN W. MILLER. [L. S.]